United States Patent [19]

Pierrat

[11] 4,309,040
[45] Jan. 5, 1982

[54] LINEAR SEAL APPARATUS

[75] Inventor: Michel A. Pierrat, Andover, Mass.

[73] Assignee: Ferrofluidics Corporation, Nashua, N.H.

[21] Appl. No.: 155,949

[22] Filed: Jun. 3, 1980

[51] Int. Cl.³ .............................................. F16J 15/54
[52] U.S. Cl. ...................................................... 277/80
[58] Field of Search ........................ 277/80, 81, 15, 65

[56] References Cited

U.S. PATENT DOCUMENTS

| | | | |
|---|---|---|---|
| 3,010,742 | 11/1961 | Kosatka | 277/96 |
| 3,722,896 | 3/1973 | Tankus | 277/87 |
| 3,788,650 | 1/1974 | Place | 277/80 |
| 3,843,140 | 10/1974 | Mayer et al. | 277/15 |
| 4,054,293 | 10/1977 | Hoeg et al. | 277/80 |
| 4,171,818 | 10/1979 | Moskowitz | 277/80 |

Primary Examiner—Robert I. Smith
Attorney, Agent, or Firm—Richard P. Crowley

[57] ABSTRACT

A seal apparatus to prevent the escape of a ferrofluid from a multiple-stage ferrofluid rotary seal about a shaft during axial movement of the shaft element, the seal apparatus comprising a pressure ring element against one facing wall of the rotary seal, a scraper ring element positioned within the pressure ring element, the scraper ring having a sharp forward edge adapted to contact the exterior surface of the shaft to prevent the escape of ferrofluid from the seal, and tension means to force inwardly the pressure ring and scraper ring toward the seal means.

9 Claims, 2 Drawing Figures

LINEAR SEAL APPARATUS

BACKGROUND OF THE INVENTION

Rotary seals are often employed to seal about a round shaft element moving linearly; that is, axially, an undetermined distance, with or without the simultaneous rotation of the shaft about its axis. One of the problems associated with the rotary-type seal, wherein a shaft element moves linearly or axially, is the problem associated with the escape of the lubricant from the rotary-type seal during such linear motion. The escape of lubricant from rotary-type seals increases with the wear of the seal and is particularly a problem in connection with low-viscosity, ferrofluid-type, multiple-stage rotary seals, such as the type described in U.S. Pat. No. 3,620,584.

SUMMARY OF THE INVENTION

My invention relates to a linear seal to prevent the escape of a lubricant from a rotary seal about a shaft element and to the method of preventing such escape of the lubricant. In particular, the invention concerns a linear seal apparatus, in combination with a multiple-stage ferrofluid-type rotary seal, which linear seal apparatus prevents the escape of ferrofluid, during reciprocating axial motion of the shaft element.

The linear seal apparatus of the invention comprises a rotary-seal or other shaft-sealing or lubricating means, and particularly a ferrofluid, multiple-stage, rotary-type seal employed in connection with a shaft to seal the rotary motion of the shaft, or both linear and rotary motions of the shaft, in combination with a linear seal apparatus, to prevent the escape of the lubricant from the seal during axial movement of the shaft. In particular, my apparatus employs a ferrofluid rotary-type seal to seal a round, magnetically permeable shaft moving axially a particular distance or reciprocating a particular axial distance, with or without simultaneous rotation of the shaft about its axis, and a linear seal to prevent the escape of the ferrofluid from the rotary seal, during the axial displacement of the shaft.

My invention comprises a linear seal positioned adjacent at least one end of the rotary-type seal; that is, at the end of which escape of the lubricant is desired to be prevented, or at both ends. The linear seal of the invention includes a pressure ring having a lower tapered surface, with one wall of the pressure ring adapted to be placed in a sealing relationship with one wall of the rotary seal and to fit loosely about the shaft, and a scraper ring having a mating, upper, tapered surface which fits and cooperates within the tapered section of the pressure ring and presents at one end a sharp scraping or wiping peripheral edge directed toward the seal, to scrape the lubricant from the exterior surface of the shaft, during axial displacement of the shaft, thereby preventing the escape of the lubricant from the rotary seal.

The linear seal apparatus includes a tension means which forces the pressure ring and scraper ring inwardly toward the rotary seal, so that the pressure ring is placed in a fluid-sealing relationship against the exterior wall of the rotary seal, while the scraper ring and the sharp forward edge thereof are placed in a continuing, lubricant scraping relationship with and about the surface of the shaft. The tension source may be a spring- or tension-loading means, forcing the scraping ring into the female conical cavity formed by the pressure ring, and the one edge of the ring into a scraping relationship with the shaft. The tension means compensates for wear and zero clearance, during operation and axial displacement of the shaft.

Thus, the linear seal apparatus comprises in combination a ferrofluid rotary-type seal and a wear-compensating, tension-loaded, scraper ring element, preferably a metal, located adjacent to at least one of the pole pieces of the rotary-type seal or on both sides, depending on the desire to prevent escape of lubricant from one or both sides. The scraper ring will collect the ferrofluid by scraping it from the surface of the shaft, as the ferrofluid attempts to escape from the rotary seal, during axial displacement of the shaft. Concentricity and tolerance problems are eliminated by providing for and floating the scraper ring about the shaft, and providing a face seal between the pressure ring and the external wall of the pole piece of the rotary seal. The linear seal apparatus thus overcomes the problems of the escape of lubricant from the rotary shaft employed with a rotary-type seal. The one sharp edge of the scraper ring, about the peripheral exterior surface of the shaft, is under tension and provides for self-compensation during use, since the edge of the scraper ring is sharpened during use; that is, by movement of the shaft against the sharp edge of the ring, while the edge of the scraper ring is constantly tensioned forward and into a scraping contact or relationship about and with the exterior surface of the shaft through the tension means.

The linear seal apparatus may be employed in a variety of operations to inhibit or prevent the escape of a lubricant or other material. However, in one preferred embodiment, the linear seal apparatus is designed to prevent the escape of low-viscosity lubricant, and particularly low-viscosity ferrofluid, from a multistage, ferrofluid rotary-type seal, through reciprocating axial movement of the shaft. Thus, the linear seal apparatus may be placed on one or either side of the lubricant source, where reciprocating motion of the shaft occurs and it is desired to prevent the escape of lubricant from either side.

The invention also comprises a method of preventing the escape of a lubricant, such as a ferrofluid, during the axial movement of the shaft, which method comprises surrounding the exterior peripheral surface of the shaft with a scraper ring having a sharp scraping edge, providing a pressure ring to retain the scraper ring in a position adjacent to the external wall of the rotary seal about the shaft, sealing the pressure ring against the exterior wall of the rotary seal, and continually forcing the scraper ring forward toward the rotary seal and the sharp edge of the scraper ring into a scraping relationship with the exterior surface of the shaft, whereby any lubricant escaping by axial movement of the shaft is forced, by scraping contact of the sharp edge, back toward the lubricating source in the rotary seal.

My invention will be described for the purpose of illustration only in connection with a particular embodiment; however, it is recognized that those persons skilled in the art may make various changes, modifications and improvements in the embodiment as illustrated, all within the scope of the present invention.

DESCRIPTION OF THE EMBODIMENTS

Figures 1, 2:
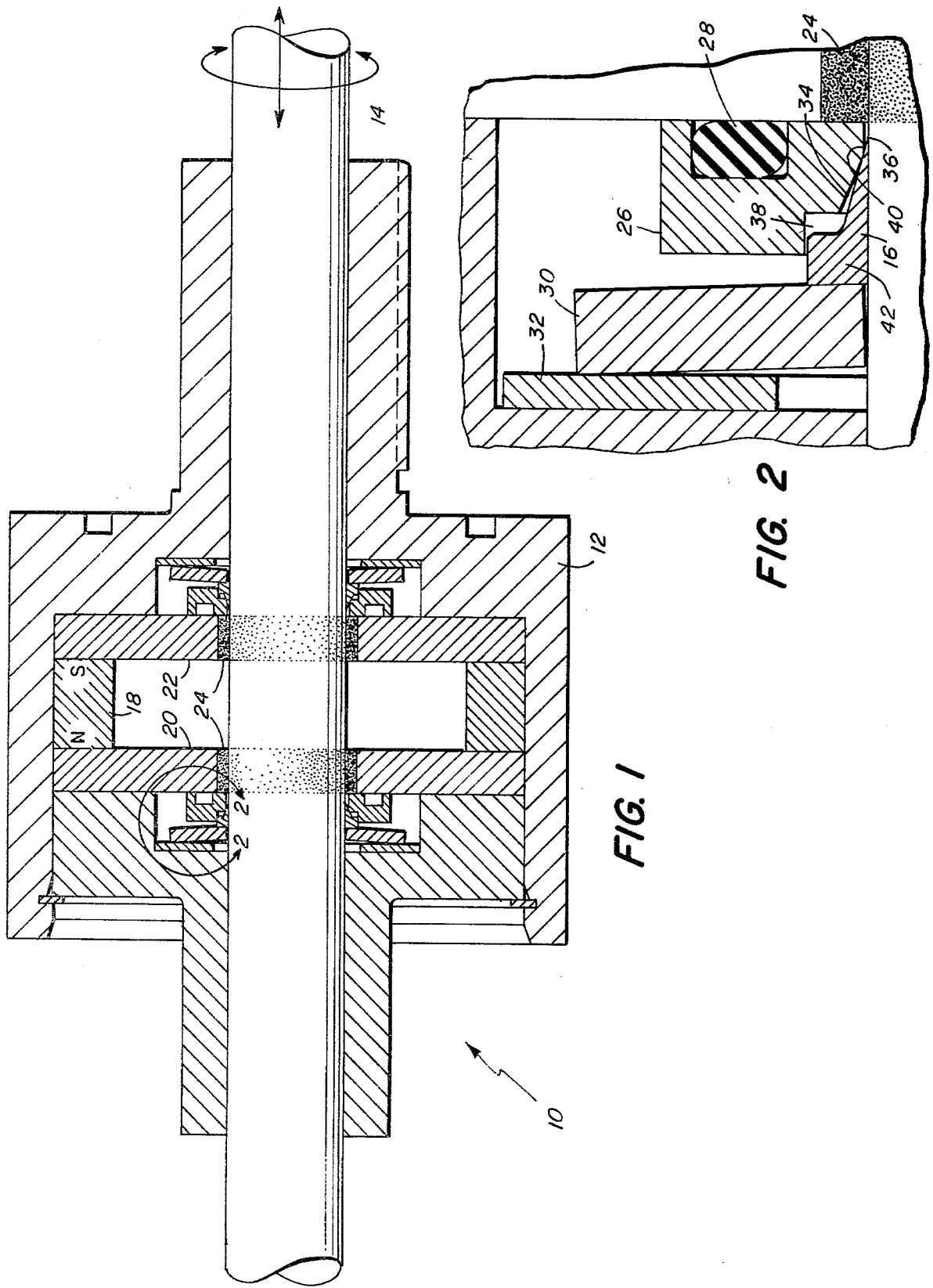
FIG. 1 is a schematic, illustrative, cross-sectional view of the linear seal apparatus of the invention.
FIG. 2 is an enlarged, fragmentary, schematic, illustrative view of a portion of the linear seal apparatus of FIG. 1.

FIGS. 1 and 2 show a linear seal apparatus 10 having a housing 12 which serves as a housing about and a bearing for a shaft 14, the shaft adapted for rotary motion or for axial linear motion, or a combination thereof. The shaft 14 is sealed through a multiple-stage, ferrofluid rotary seal which comprises a ring permanent magnet 18 and a pair of magnetically permeable pole pieces 20 and 22, each extending from one end of the permanent magnet 18 and into a close, noncontacting relationship with the exterior surface of the magnetically permeable metal shaft 14, to form a small gap of about 2 to 10 mils. A low-viscosity ferrofluid 24 is disposed in the gap and retained therein, with the magnetic flux path passing from the poles of the magnet through the pole pieces and the shaft, to form a ferrofluid rotary seal. The shaft 14, as illustrated, is shown to be adapted for both rotary and reciprocating axial motion and includes a linear seal on either side of and adjacent to the pole pieces 20 and 22, and includes a loosely fitted metal pressure ring element 26 having a lowered tapered surface, to provide, with the shaft 14, for a conical cavity about the exterior surface of the shaft 14, the pressure ring 26 containing an O-ring gasket 28 preferably made of a lubricant-resistant or ferrofluid-resistant elastomeric or sealing material, whereby the pressure ring 26 may be placed in a fluid-tight sealing relationship with the exterior wall of the pole piece 20 or 22. The metal tapered pressure ring 26, a generally tapered surface 34 and being loosely fitted, forms a generally peripheral small ring cavity 36 adjacent the gap formed by the pole pieces 20 and 22 against the exterior surface of the shaft 14. The pressure ring 26 is characterized by a peripheral outer cavity 38.

A metal scraping ring 16, a tapered upper surface and having a sharp scraping edge 40 thereon, fits in a cooperating mating relationship within the pressure ring 26 and against the tapered surface 34, so that the sharp edge is placed in a contacting, scraping relationship with the exterior surface of the shaft 14 and extends toward and closely to the exterior wall of the pole pieces 20 and 22 in cavity 36, as illustrated more particularly in FIG. 2. The scraping ring 16 is designed to fit along its base into a close, snug relationship with the exterior surface of the shaft 14, and the one raised embossed end 42 thereof to fit within the ring-like cavity 38 of the pressure ring 26 in a loose relationship, as illustrated. A spring washer 30 is employed, together with a thrust washer 32, which is optional, within the housing and formed, so as to provide a tension force to push the scraping ring 16 axially against the tapered surface 34 and the scraper ring edge 40 into a scraping relationship with the surface of the shaft 14. Thus, as illustrated, the scraper ring 16 fits within pressure ring 26 and is forced forward by the spring washer 30 into a scraping relationship. The scraper ring 16 forces the pressure ring 26 with gasket 28 into a sealing relationship with the exterior wall of the pole piece 20 or 22.

In operation, the linear movement of the shaft 14 normally would tend to permit the escape of ferrofluid 24 along the linear path movement of the shaft. However, the linear seal apparatus places the sharp edge of the scraper ring 16 into continuous contact with the surface of the shaft 14, and ferrofluid escaping is scraped from the shaft surface and forced backwardly into the gap 24, while the loosely fitted pressure ring 26 is retained in a sealing engagement against the external wall of the pole pieces 20 and 22, through the use of the O-ring peripheral gasket 28 and through the force of the spring washer 30, which forces the scraper ring 16 inwardly toward the pole pieces 20 and 22; thus, maintaining the pressure ring in a sealed relationship and the scraper ring in a scraping relationship, thereby retaining the ferrofluid and preventing the escape of the ferrofluid during linear motion of the shaft.

What I claim is:

1. A seal apparatus to prevent the escape of sealant lubricant from a shaft seal during axial movement of the shaft, which apparatus comprises:
   (a) a shaft seal means containing a viscous sealant ferrofluid lubricant, the seal means adapted to surround the shaft and to provide sealing during movement of the shaft, wherein the shaft seal means comprises a multiple-stage, ferrofluid rotary seal, which seal comprises a permanent ring magnet having poles of opposite polarity and a pair of magnetically permeable pole elements, each pole element at the one end in a magnetic flux relationship with one of the poles of the ring element magnet, and at the other end adapted to extend into a close, noncontacting relationship with the surface of the shaft to be sealed; and
   (b) a linear seal apparatus which comprises
      (i) a pressure ring element having an external wall surface and characterized by a lower tapered surface, which tapered surface forms, with the surface of the shaft, a generally conical cavity, the tip of which conical cavity extends toward the shaft seal means, the ring element having an internal diameter slightly greater than the diameter of the shaft about which it is to be employed,
      (ii) a scraper ring element characterized by an upper tapered surface, which surface cooperatively mates in a sliding mating relationship with the lower tapered surface of the pressure ring element, and which scraper ring element has a lower surface which fits into a close, snug relationship with and about the shaft, and which scraper element has an edge thereon, the tapered scraper ring positioned at least partially within the conical cavity, the sharp end of the scraper ring extending toward the shaft seal means and into a close, sealant, scraping relationship with the external surface of the shaft, and
      (iii) tension means to force the wall surface of the pressure ring forward into a sealing relationship with the shaft seal means, and to force the scraper ring element, within the conical cavity, toward the shaft seal means and the edge of the scraper ring element into a scraping relationship with the exterior surface of the shaft,
   whereby a sealant lubricant, which escapes from the shaft seal means by the axial movement of the shaft, is scraped from the external surface of the shaft by the edge of the scraper ring element and is forced back toward the shaft seal means.

2. The apparatus of claim 1 wherein the pressure ring element includes an O-ring gasket, which O-ring gasket forms a fluid-sealing relationship with the shaft seal means.

3. The apparatus of claim 1 wherein the pressure ring element is characterized, at the outer wall surface, by a ring-like cavity, and wherein the scraper ring element contains, at the outer end thereof, a raised ridge, the upper surface of which fits in a loose relationship with the lower surface of the cavity of the pressure ring element.

4. The apparatus of claim 1 wherein the tension means includes a spring washer and a housing, the spring washer positioned within the housing to force the scraper ring element toward the shaft seal means.

5. The apparatus of claim 1 wherein the pressure ring, the scraper ring element and the tension means are positioned on either side of the rotary seal means, to prevent the escape of sealant during reciprocating axial movement of the shaft.

6. The apparatus of claim 1 wherein the linear seal apparatus is positioned on either side of the pole elements, with each pressure ring element in a sealing relationship with the exterior wall of one of the pole elements.

7. the apparatus of claim 1 which includes a housing containing the rotary and linear seal apparatus and a shaft passing through the housing which is sealed by the rotary seal means.

8. A seal apparatus to prevent the escape of a ferrofluid from a multiple-stage, rotary shaft ferrofluid during reciprocating axial movement of the shaft, which apparatus comprises in combination:
   (a) a ferrofluid rotary shaft seal means containing a plurality of magnetically permeable pole elements and a ring magnet, the pole elements magnetically coupled to one or the other pole of the ring magnet, one end of each pole elements extending into a close, noncontacting relationship with the surface of a shaft element to be inserted in the seal apparatus to form a gap therebetween, and a ferrofluid adapted to be retained by the concentrated magnetic flux lines within the gap at the end of each pole piece; and
   (b) a linear seal apparatus adjacent each pole element to prevent the escape of ferrofluid from the rotary seal means which comprises
      (i) a pressure ring element having a wall surface containing a gasket material adjacent to and in contact with the adjoining wall surface of the pole element and characterized by a lower tapered surface which forms with the shaft a generally conical cavity, the tip of which cavity extends toward the other end of the pole element, each of the pressure ring elements having an internal diameter slightly greater than the external diameter of the shaft and having a peripheral outer cavity,
      (ii) a scraper ring element characterized by an upper tapered surface which cooperatively mates in a sliding relationship with the lower tapered surface of the pressure ring element, and having a lower surface which fits in a snug relationship with and about the shaft, and having a sharp tapered end which extends toward and in a close relationship with the ends of the pole elements, the tapered end positioned at least partially within the conical cavity and into a close, ferrofluid, scraping relationship with the exterior surface of the shaft, and the other end of the scraper ring having a peripheral raised ridge which fits within the cavity of the pressure ring element, and
      (iii) tension means to force the peripheral raised ridge of the scraper element into the pressure ring cavity and the edge of the scraper ring element into a close, ferrofluid, scraping relationship with the exterior surface of the shaft near the gap containing the ferrofluid, the scraper ring forcing the pressure ring element and the gasket material into a sealing relationship with the exterior wall surface of the pole elements, whereby ferrofluid, which might escape from the gap at the end of each of the pole elements of the multistage rotary seal, is scraped from the surface of the shaft by the edges of the scraper rings and is forced back toward the respective pole elements of the rotary shaft means.

9. The apparatus of claim 8 which includes a housing containing the rotary shaft seal means and linear seal apparatus and a shaft passing through the housing which is sealed by the ferrofluid rotary seal means and the linear seal apparatus.

* * * * *